May 9, 1961  J. B. VILMERDING  2,983,353
INDEXING DEVICE
Filed June 9, 1958

INVENTOR
JOHN B. VILMERDING
BY
HIS ATTORNEY

United States Patent Office 2,983,353
Patented May 9, 1961

2,983,353

INDEXING DEVICE

John B. Vilmerding, Owego, N.Y., assignor to Ingersoll-Rand Company, New York, N.Y., a corporation of New Jersey Filed June 9, 1958, Ser. No. 740,774

2 Claims. (Cl. 193—43)

This invention relates to an indexing device and more particularly to an indexing device for non-symmetrical elements.

An object of this invention is to properly align an element with respect to a member having a conformation adapted to receive such an element by rotating one relative to the other.

Another object of this invention is to align the element with respect to the member conformation by a jostling or vibrating action.

Another object of this invention is to provide an indexing device for elements having a non-symmetrical shape with respect to at least one of its axes.

Figure 1:
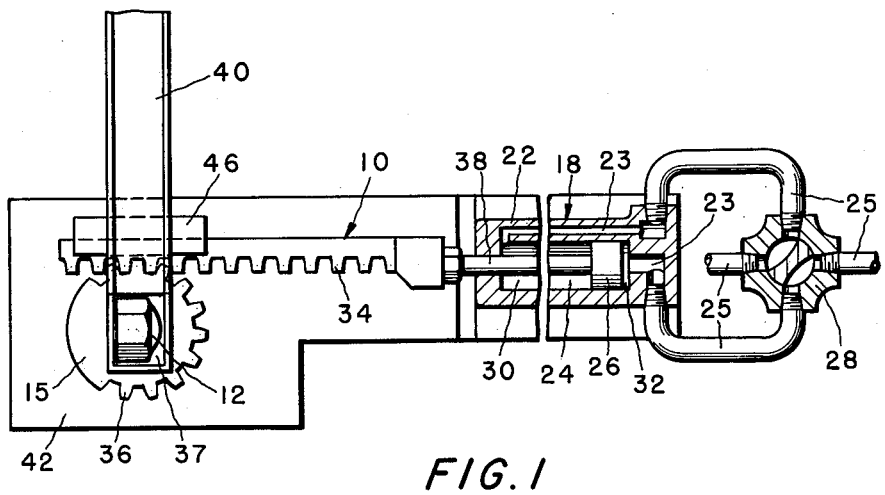
Figure 2:
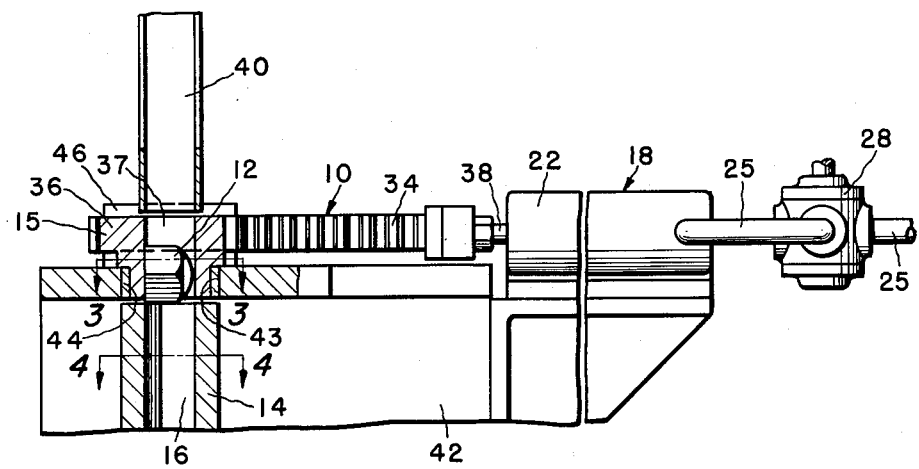
Figure 4:
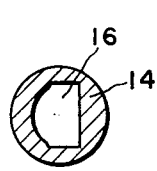
Figure 3:
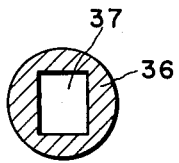

Further objects will become obvious from the following specification and drawing in which Figure 1 is a plan view, partly in section, of an indexing device embodying a preferred form of the invention, Fig. 2 is a longitudinal view, partly in section, of Fig. 1, Figs. 3 and 4 are cross-sectional views of Fig. 2 taken along the lines 3—3 and 4—4, respectively, looking in the direction of the arrows.

Referring to the Figs. 1 and 2 in which is shown an indexing device 10 for elements, such as a cap nut 12, fed into a member or receiving chute 14 having a passage 16 for such purposes. The member 14 has a passage conformation adapted to receive the nut 12 only when there is a predetermined positional relationship between said nut and passage conformation. And the member 14 can be rotatable, such as a rotatable feed through socket similar to that shown in U.S. patent application Serial No. 677,287.

Whether or not the member 14 rotates, the nut 12 is loosely held adjacent the bore 16 of said member 14 by means 15 of the device 10. This means 15 rotates the nut 12 relative to member 14 and jostles or vibrates the nut 12 until said nut 12 becomes aligned with the passage conformation. Any suitable means, in this instance gravity, may be used to urge the nut from the means 15 into the member 14.

In the preferred form of the invention the means 15 is driven by a conventional air motor 18. This motor 18 includes a casing 22 having a chamber 24 in which a piston 26 reciprocates. The piston 26 is driven by alternately supplying and exhausting air under pressure to and from the opposite end portions of the chamber 24. A valve 28, passages 23 in the casings 22 and conduits 25 supply air under pressure from a suitable source (not shown) alternately to the front end 30 of the chamber 24 and to the rear end 32 thereof and simultaneously exhaust air from the chamber end portion opposite the end portion being supplied with air.

The motor driven means 15 includes a rack 34 and circular gear 36 having a passage 37 extending therethrough with a conformation constructed to loosely engage a nut conveyed thereto by a chute 40. The rack 34 has one end secured to a stem 38 which extends through the motor casing 22 and is attached to the piston 26. The gear 36 meshes with the opposite end of the rack 34 so that when the piston 26 reciprocates the rack 34, the gear 36 is alternately rotated in opposite directions having its rotative direction quickly changed.

The cap nut 12 is non-symmetrically shaped about its vertical axis and is fed into the gear passage 37 in its vertical position by the delivery chute 40. The bore 16 of the member 14 substantially conforms to the vertical outline of the cap nut 12 so that the member 14 can receive the nut 12 only when they are in alignment. To properly align these parts the gear 36 alternately rotates the nut 12 in opposite directions relative to the member 14 jostling or vibrating the loosely held nut 12 when said gear 36 quickly changes its rotative direction. Therefore, along with intermittent rotation relative to the member 14 the cap nut 12 is jostled or jerked into alignment with the member conformation.

For convenience the motor 18 and rack 34 and gear 36 are mounted on a common frame 42. The gear 36 is rotatably seated in a bore 43 of the frame 42. To lengthen the life of both parts 36 and 42 a wearing sleeve 44 is interposed between them in the bore 43. The rack 34 slidably rests on a slide 46 secured to the frame 42 adjacent the gear 36.

In the preferred form of the invention it has been found that favorable results are obtained when the after mentioned parts operate as follows. A cap nut 12 is discharged from the chute 40 into the passage 37 of the gear 36 in a vertical position within 180° of its correct position. The gear 36 then intermittently rotates the nut 12 relative to the member 14 and jostles it until the nut 12 is aligned with the bore conformation at which time said nut 12 will pass into said member 14.

While I have shown and described a specific form of my invention, it is to be understood that various changes and modifications may be made without departing from the spirit of the invention as set forth in the appended claims.

I claim:

1. An indexing device for elements comprising a frame, a single member having gear teeth thereon rotatably mounted in the frame and provided with an opening therein of slightly greater area than one of the elements and having a conformation such as to allow slight rotation of one of the elements, a rack slidably mounted with respect to the frame and meshing with the single member, means connected to the rack for reciprocating the rack, and a receiving chute disposed next to one face of the single member and having a passage having the same conformation as the elements, the rack reciprocating and causing the single member to move in opposite directions through an arc of a circle to jostle one of the elements in the single member until its conformation registers with the conformation of the passage in the receiving chute and then falling into the receiving chute.

2. An indexing device for elements comprising a frame, a single member having gear teeth thereon rotatably mounted in the frame and provided with an opening therein of slightly greater area than one of the elements and having a conformation such as to allow slight rotation of one of the elements, a rack slidably mounted with respect to the frame and meshing with the single member, means connected to the rack for reciprocating the rack, a delivery chute disposed adjacent one face of the single member, and a receiving chute disposed next to the other face of the single member and having a passage having the same conformation as the elements, the rack reciprocating and causing the single member to move in opposite directions through an arc of a circle to jostle one of the elements in the single member until its conformation registers with the conformation of the passage in the receiving chute and then falling into the receiving chute.

References Cited in the file of this patent

UNITED STATES PATENTS

| | | |
|---|---|---|
| 1,341,278 | Morey | May 25, 1920 |
| 1,347,851 | Haefele | July 27, 1920 |
| 1,411,169 | Ehrman | Mar. 28, 1922 |
| 2,810,248 | Dimond | Oct. 22, 1957 |